US011405875B2

(12) United States Patent
Akkarakaran et al.

(10) Patent No.: US 11,405,875 B2
(45) Date of Patent: *Aug. 2, 2022

(54) SIGNALING OF SYNCHRONIZATION BLOCK PATTERNS

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 96 days.

This patent is subject to a terminal disclaimer.

(21) Appl. No.: 16/845,855

(22) Filed: Apr. 10, 2020

(65) Prior Publication Data

US 2020/0245280 A1 Jul. 30, 2020

Related U.S. Application Data

(63) Continuation of application No. 16/000,595, filed on Jun. 5, 2018, now Pat. No. 10,645,660.

(Continued)

(51) Int. Cl.
*H04W 56/00* (2009.01)
*H04J 11/00* (2006.01)
(Continued)

(52) U.S. Cl.
CPC ...... *H04W 56/0005* (2013.01); *H04B 7/2668* (2013.01); *H04J 11/0093* (2013.01);
(Continued)

(58) Field of Classification Search
CPC ......... H04W 56/0005; H04W 52/0261; H04W 8/005; H04W 56/0015; H04W 72/042;
(Continued)

(56) References Cited

U.S. PATENT DOCUMENTS 8,886,208 B2   11/2014  Anand et al.
2003/0093264 A1*  5/2003  Miyasaka ............... G10L 19/24
704/205

(Continued)

FOREIGN PATENT DOCUMENTS

| WO | 2013142415 | | 9/2013 |
|---|---|---|---|
| WO | 2015109153 | A1 | 7/2015 |
| WO | 2017096121 | A1 | 6/2017 |

OTHER PUBLICATIONS

International Search Report and Written Opinion—PCT/US2018/036303—ISA/EPO—dated Aug. 14, 2018, 17 Pages.

(Continued)

*Primary Examiner* — Rina C Pancholi
(74) *Attorney, Agent, or Firm* — Arent Fox LLP (57) ABSTRACT

The present disclosure describes various examples of a method, an apparatus, and a computer readable medium for signaling synchronization block patterns in wireless communications (e.g., 5th Generation New Radio (5G NR)). For example, one of the methods described may include receiving, by a user equipment (UE), a message including information of a configuration. The configuration includes at least a group of repetitions of one or more synchronization signal (SS) blocks in an SS burst set, and the repetitions of the one or more SS blocks are configured into at least two groups. The method may further include determining, by the UE, which group of the at least two groups to search for during a synchronous neighbor cell search based on the information and at least one condition at the UE.

30 Claims, 5 Drawing Sheets

Related U.S. Application Data (60) Provisional application No. 62/517,542, filed on Jun. 9, 2017.

(51) Int. Cl.
| | | |
|---|---|---|
| *H04B 7/26* | (2006.01) | |
| *H04L 5/00* | (2006.01) | |
| *H04W 52/02* | (2009.01) | |
| *H04W 8/00* | (2009.01) | |
| *H04L 27/26* | (2006.01) | |
| *H04W 72/04* | (2009.01) | |

(52) U.S. Cl.
CPC .......... *H04L 5/005* (2013.01); *H04L 5/0094* (2013.01); *H04L 27/2611* (2013.01); *H04W 8/005* (2013.01); *H04W 52/0261* (2013.01); *H04W 56/0015* (2013.01); *H04W 72/042* (2013.01)

(58) Field of Classification Search
CPC ... H04L 5/0094; H04L 27/2611; H04L 5/005; H04B 7/2668; H04J 11/0093
See application file for complete search history.

(56) References Cited

U.S. PATENT DOCUMENTS

| | | | |
|---|---|---|---|
| 2013/0229307 A1* | 9/2013 | Chang | H01Q 3/34 342/372 |
| 2013/0250818 A1* | 9/2013 | Gaal | H04J 11/0069 370/277 |
| 2016/0337916 A1* | 11/2016 | Deenoo | H04W 36/0088 |
| 2017/0244434 A1* | 8/2017 | Sesia | H04B 1/1027 |
| 2018/0359717 A1 | 12/2018 | Akkarakaran et al. | |
| 2019/0306820 A1* | 10/2019 | Jiang | H04W 56/0015 |

OTHER PUBLICATIONS

International Preliminary Report on Patentability—PCT/US2018/036303 The International Bureau of WIPO—Geneva, Switzerland, dated Dec. 10, 2019.

* cited by examiner

SIGNALING OF SYNCHRONIZATION BLOCK PATTERNS

CROSS-REFERENCE TO RELATED APPLICATION

This application is a Continuation of U.S. patent application Ser. No. 16/000,595, entitled "SIGNALING OF SYNCHRONIZATION BLOCK PATTERNS" and filed on Jun. 5, 2018, which priority to U.S. Provisional Application Ser. No. 62/517,542, entitled "SIGNALING OF SYNCHRONIZATION BLOCK PATTERNS" and filed on Jun. 9, 2017, each of which is assigned to the assignee hereof and are hereby expressly incorporated by reference in their entireties.

BACKGROUND

The present disclosure relates generally to wireless communications systems, and more particularly, to techniques for signaling synchronization block patterns in wireless communications (e.g., 5th Generation New Radio).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, higher capacity, and lower latency, new approaches may be desirable to improve the system reliability and energy efficiency by using enhanced signaling of synchronization block patterns, in order to enhance waveform and air-interface design, and physical layer procedures, satisfy consumer demand, and improve user experience in wireless communications, e.g., 5G NR communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method related to signaling synchronization block patterns is provided as part of this disclosure. According to one example, the method may include receiving, by a user equipment (UE), a message including information of a configuration, wherein the configuration includes at least a group of repetitions of one or more SS blocks in an SS burst set, wherein the repetitions of the one or more SS blocks are configured into at least two groups, and determining, by the UE, which group of the at least two groups to search for during a synchronous neighbor cell search based on the information and at least one condition at the UE.

In another aspect, an apparatus, (e.g., a UE) for wireless communications is provided that includes a receiver, a memory configured to store instructions, and at least one processor communicatively coupled with the receiver and the memory. For example, the at least one processor may be configured to execute the instructions to receive, via the receiver, a message including information of a configuration, wherein the configuration includes at least a group of repetitions of one or more SS blocks in an SS burst set, wherein the repetitions of the one or more SS blocks are configured into at least two groups, and determine, by the UE, which group of the at least two groups to search for during a synchronous neighbor cell search based on the information and at least one condition at the UE.

In another aspect, an apparatus, (e.g., a UE) for wireless communications is provided that includes means for receiving a message including information of a configuration, wherein the configuration includes at least a group of repetitions of one or more SS blocks in an SS burst set, wherein the repetitions of the one or more SS blocks are configured into at least two groups, and means for determining which group of the at least two groups to search for during a synchronous neighbor cell search based on the information and at least one condition at the UE.

In another aspect, a computer-readable medium (e.g., a non-transitory computer-readable medium) storing code executable by at least one processor for wireless communications and comprising code for receiving a message including information of a configuration, wherein the configuration includes at least a group of repetitions of one or more SS blocks in an SS burst set, wherein the repetitions of the one or more SS blocks are configured into at least two groups, and code for determining which group of the at least two groups to search for during a synchronous neighbor cell search based on the information and at least one condition at the UE.

In another aspect, a method related to signaling synchronization block patterns is provided. According to one example, the method may include configuring, by a base station, repetitions of one or more SS blocks in an SS burst set into at least two groups, and sending, by the base station to a UE, a message including information of the configuration.

In another aspect, an apparatus (e.g., a base station) for wireless communications is provided that includes a transceiver, a memory configured to store instructions, and one or more processors communicatively coupled with the transceiver and the memory. The one or more processors are configured to execute the instructions to configure, by the base station, repetitions of one or more SS blocks in an SS burst set into at least two groups, and send, by the base station to a UE, a message including information of the configuration.

In another aspect, an apparatus (e.g., a base station) for wireless communications is provided that includes means for configuring, by a base station, repetitions of one or more SS blocks in an SS burst set into at least two groups, and means for sending, by the base station to a UE, a message including information of the configuration.

In a further aspect, a computer-readable medium (e.g., a non-transitory computer-readable storage medium) storing code executable by at least one processor for wireless communications and comprising code for configuring, by a base station, repetitions of one or more SS blocks in an SS burst set into at least two groups, and code for sending, by the base station to a UE, a message including information of the configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

DETAILED DESCRIPTION

In a wireless communications system (e.g., a 5G NR system), a synchronization channel may include one or more synchronization signal (SS) blocks. In some aspects, an SS block may include a group of contiguous OFDM symbols. In some instances, the OFDM symbols in an SS block may include one symbol for a primary synchronization signal (PSS), one symbol for a secondary synchronization signal (SSS), and/or one or more symbols for a physical broadcast channel (PBCH). In an aspect, one or more SS blocks may be repeated, and possibly in different beam directions, to form an SS burst set. In some implementations, for example in millimeter Wave (mmW) or in one or more other bands, beamforming gain may be used to overcome high propagation loss during communications. In an example, a user equipment (UE) may search in different beam directions to acquire the synchronization channel.

In some aspects, for an initial cell search and/or detection of asynchronous neighbor cells, more repetitions of SS blocks may not affect search complexity (e.g., at the UE). For example, a UE may acquire timing (e.g., OFDM symbol timing) first (e.g., by searching or detecting a PSS) for synchronization, and more repetitions of SS blocks may speed up the timing acquisition at some expense of higher or more overhead in the synchronization channel. In an aspect, in order to obtain timing information, a UE may search for a PSS by beam sweeping in different directions, and detect the beam where the PSS is strong enough. SSS and/or PBCH may be detected after the UE detects a proper PSS. In some examples, a PSS may be used for multiple cells.

In some aspects, for synchronous neighbor cell search, more repetitions may raise search complexity (e.g., at the UE). In an example, a UE may be aware of the rough cell timing, but the UE may not know which of the repeated SS blocks corresponds to the direction of the maximum beamforming gain. In this case, the UE may have to search or measure the power of the synchronization channel along all the directions.

In some implementations, neighbor cell searching is a dominant power consumption component of the acquisition module at the UE or a network entity. In some cases, the number of repetitions of SS blocks may be related to the power consumption at the UE. For example, the more repetitions of SS blocks, the more power may be consumed by the UE. As such, to save UE power and tradeoff between search complexity and neighbor cell acquisition time, enhanced signaling of synchronization block patterns or schemes may be desirable to improve the system reliability and to enhance system energy efficiency, e.g., in a 5G NR system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Described herein are various aspects related to a wireless communications system (e.g., a 5G NR system), in particular, techniques for synchronization signal (SS) transmissions and receptions. In some aspects, the repetitions (e.g., 64 repetitions) of SS blocks (e.g., PSS, SSS, and/or PBCH) in an SS burst set may be organized into one or more groups. In some examples, the one or more groups are based on beam width (e.g., different beam widths). For example, a first group may include a number of beams (e.g., fewer beams compared with a second group), and each beam in the first group has a broad or wide beam width (e.g., compared with a second group), to cover the whole cell in angular domain but with low beamforming gain. Meanwhile, for example, another group (a second group) may have a larger number of beams (e.g., compared with the first group), and each beam in the second group has a narrow beam width and high beamforming gain. In some cases, by using the second group, a cell may experience good coverage (e.g., better coverage compared to using the first group) in both angular domain and cell radius. In some implementations, the repetitions (e.g., 64 repetitions) of SS blocks in an SS burst set may not be transmitted in the same time.

In an example, the first group may include 14 beams (e.g., 14 repetitions of SS blocks) and each with broad or wide beam width and lower beamforming gain. Meanwhile, for example, the second group may include 50 beams (e.g., 50 repetitions of SS blocks), and each with narrow beam width and higher beamforming gain. In an aspect, when low power budget is determined (e.g., UE has low power), the first group may be used or implemented to save power. In another aspect, when a higher power budget is determined (e.g., UE has enough power), the second group may be used or implemented to achieve good coverage (e.g., better coverage compared to the first group) in both angular domain and cell radius.

In an aspect, the SS block repetitions may not be time or frequency contiguous, and the same may hold for the SS block groups as well, even if the SS burst set consists entirely of time and frequency contiguous SS blocks. For example, the SS block groups may not be time or frequency contiguous.

In some aspects, a base station (e.g., a next generation NodeB or a gNB) may signal (e.g., via a message or an indication) to a UE which group(s) of SS blocks to search for during synchronous neighbor cell search. In some examples, the signaling may be sent or transmitted via at least one of a master information block (MIB), a master system information block (mSIB), a system information block (SIB), a radio resource control (RRC) message, a medium access control (MAC) control element (CE) or a MAC CE, a downlink control information (DCI), or any combination thereof, or any other suitable signaling. For example, if the UE is low on battery (e.g., low battery level compared to a threshold), to reduce complexity, the base station may signal or indicate (e.g., via a RRC message, MAC CE or DCI) to the UE a group of a small number of beams for the UE to use or search for. In an aspect, when signaling using SIB, more than one group (e.g., two groups) may be used. For example, the two groups may include a high complexity group and a low complexity group, among which the UE may be free to choose depending on a battery level of the UE or other factors at the UE. In some cases, the base station may send all of the SS blocks (e.g., all the groups of SS blocks). In an aspect, battery-limited UEs or UEs in low battery level may be allowed to search only among one of the groups sent by the base station.

In some examples, a UE may send or report one or more metrics to assist or help a base station (e.g., a gNB) to decide or determine which group of SS blocks or repetitions of SS blocks to configure for the UE. In an example, the one or more metrics may include a metric of battery life, battery level(s) or power level(s) of the UE. In another example, the one or more metrics may include a metric of power consumption during neighbor cell search, for example, as a function of one or more search parameters. In some implementations, the one or more search parameters may include an SS block group size, or the number of neighbor cells to be searched.

In some cases, the one or more metrics may directly indicate a preferred group, a group size, or an SS block repetition pattern. In some examples, the one or more metrics or the information (e.g., sent by the UE to the base station) may be used to create partitioning into groups, and/or to signal or indicate which group the UE would use or search for. In an example, the UE may only need to know the definition of the group the UE is asking (or is asked) to use or search for.

In some aspects, the one or more metrics may be reported (e.g., by a UE) via an RRC message, a MAC CE, and/or a control channel (e.g., physical uplink control channel (PUCCH)). In some cases, a UE may determine whether one or more conditions (e.g., a triggering condition) have been met. For example, the one or more conditions may include a predetermined power budget or a threshold of power level. In an implementation, the UE may report or send the one or more metrics when the UE decided or determined that the one or more conditions have been met. For example, the UE may send a metric when the UE determines that the battery level at the UE is below (or above) a threshold of power level (e.g., power level threshold). In another example, a base station (e.g., a gNB) may implicitly or explicitly request the UE to report the one or more metrics.

In some aspects, one or more SS block groups (e.g., with repetitions of SS blocks) may be formed or configured based on one or more angular coverages. In an example, each of the SS block groups may be divided into multiple subgroups that cover different angular spreads of a cell. In some cases, a base station (e.g., a gNB) may restrict a UE to one of the multiple subgroups, based on an estimated likelihood of which group would contain the strongest beam direction to the neighboring cells. In an implementation, the estimation is performed by the base station, and may depend on various UE reports, such as UE positioning, orientation, and/or mobility report(s). In some examples, the UE reports may be based on data collected by the UE from sensors at the UE (e.g., an accelerometer). In an aspect, when the UE is stationary (or moving slowly), the network or the base station may have a better estimate of the position and/or orientation of the UE, and thus the network or the base station may be better or easier to assess which beam direction(s) from the neighbor cells is/are strong enough or potentially strong enough to be received by the UE.

In an aspect, as discussed above, the base station may restrict the UE to one of the multiple subgroups. In an example, the subgroup restriction may be performed only when the UE is low on battery or power. In some cases, the subgroup restriction may be different for different cells in a neighbor list. For example, for new cell(s) not listed on the neighbor list, there may be no subgroup restriction for the new cell(s).

Figure 1A:
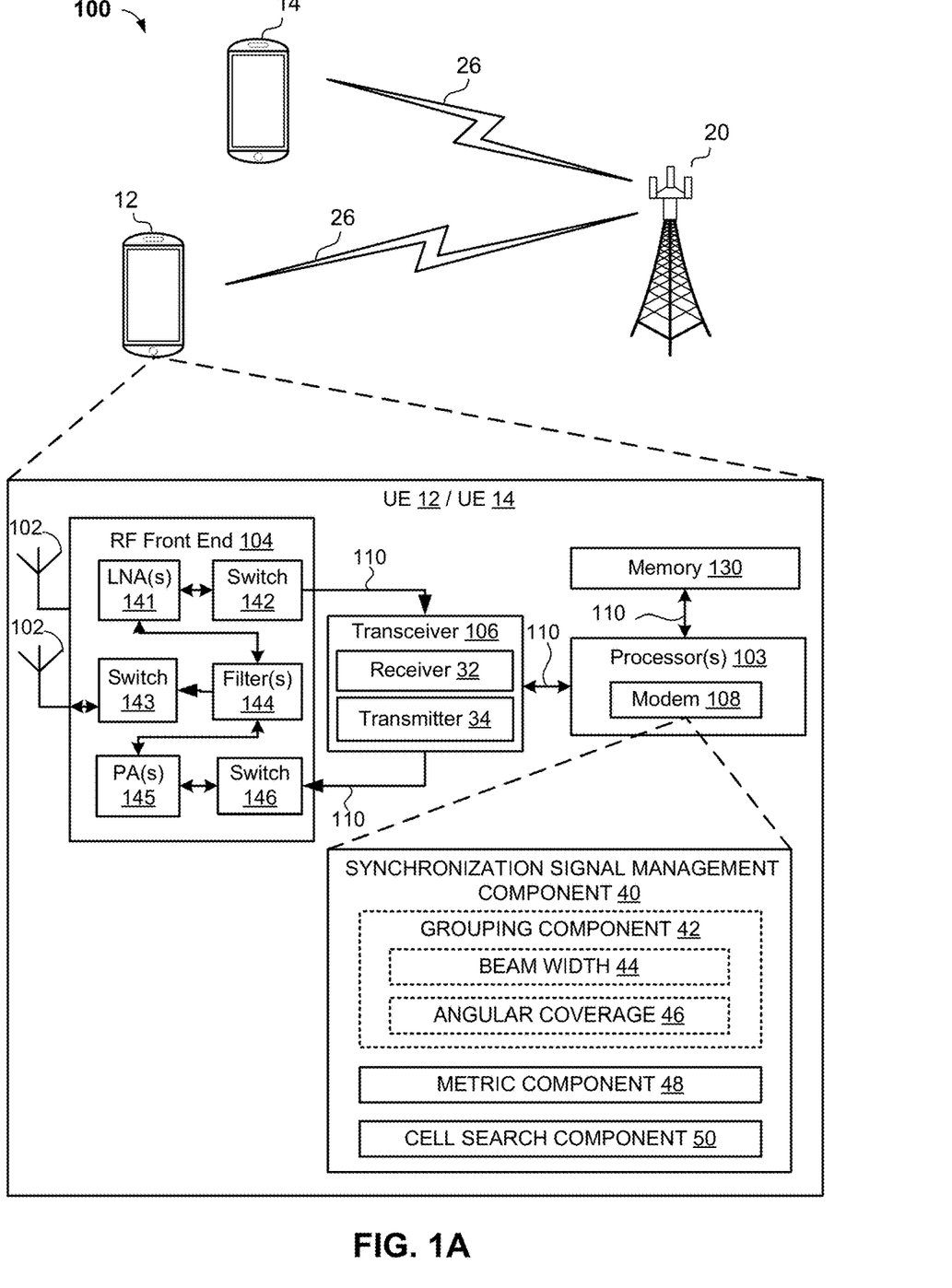
FIG. 1A is a diagram illustrating a first example of a wireless communications system (e.g., a 5G NR system) including a base station and one or more user equipments (UEs) for signaling synchronization block patterns, according to one or more of the presently described aspects.

Referring to FIG. 1A, in an aspect, a wireless communication system 100 (e.g., a 5G NR system) includes at least a UE 12 or a UE 14 in communication coverage of at least one network entity 20 (e.g., a base station or a gNB, or a cell thereof, in a 5G NR network). The UE 12 and/or UE 14 may communicate with a network via the network entity 20. In some aspects, multiple UEs, such as UE 12 and/or UE 14, may be in communication coverage with one or more network entities, including network entity 20. In an aspect, the network entity 20 may be a base station such a gNB in a 5G NR network, and/or an eNodeB/eNB in an LTE network. Although various aspects are described in relation to the Universal Mobile Telecommunications System (UMTS), LTE, or 5G NR networks, similar principles may be applied in other wireless wide area networks (WWAN). The wireless network may employ a scheme where multiple base stations may transmit on a channel. In an example, the UE 12 and/or UE 14 may transmit and/or receive wireless communications (e.g., beamforming or beams) to and/or from network entity 20. For example, the UE 12 and/or UE 14 may be actively communicating with network entity 20.

In some aspects, the UE 12 and/or UE 14 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. The UE 12 and/or UE 14 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device. Additionally, the network entity 20 may be a macrocell, picocell, femtocell, relay, Node B, mobile Node B, small cell box, UE (e.g., communicating in peer-to-peer or ad-hoc mode with UE 12 and/or UE 14), or substantially any type of component that can communicate with UE 12 and/or UE 14 to provide wireless network access at the UE 12 and/or UE 14.

According to the present aspects, the UE 12 and/or UE 14 may include one or more processors 103 and a memory 130 that may operate in combination with a synchronization signal management component 40, a grouping component 42, a metric component 48, and/or a cell search component 50. In some examples, the synchronization signal management component 40 and/or the grouping component 42 may be configured to perform synchronization signal management, or receiving synchronization block patterns. In an aspect, the metric component 48 may be configured to report one or more metrics to the network entity 20. In an aspect, the cell search component 50 may be configured to perform an initial cell search and/or asynchronous neighbor cell search, and/or related operations as described herein.

In an aspect, the term "component" as used herein may be one of the parts that make up a system, may be hardware, firmware, and/or software, and may be divided into other components. The synchronization signal management component 40 may be communicatively coupled with a transceiver 106, which may include a receiver 32 for receiving and processing radio frequency (RF) signals and a transmitter 34 for processing and transmitting RF signals (e.g., signaling synchronization block patterns, PSS, SSS, or PBCH transmissions). The synchronization signal management component 40 may include the grouping component 42, the metric component 48, and/or the cell search component 50, for performing synchronization signal management and operations. The processor 103 may be coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, an RF receiver. In an aspect, the receiver 32 may receive signals transmitted by UE 12 and/or UE 14. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, an RF transmitter.

In an aspect, the one or more processors 103 may include a modem 108 that uses one or more modem processors. The various functions related to the synchronization signal management component 40 may be included in modem 108 and/or processors 103 and, in an aspect, may be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the synchronization signal management component 40, including the grouping component 42, the metric component 48, and/or the cell search component 50.

The synchronization signal management component 40, the grouping component 42, the metric component 48, and/or the cell search component 50, may include hardware, firmware, and/or software code executable by a processor for performing detecting, reporting, transmitting, receiving, and related SS block operations. For example, the hardware may include, for example, a hardware accelerator, or specialized processor.

Moreover, in an aspect, the UE 12, and/or the UE 14, may include RF front end 104 and transceiver 106 for receiving and transmitting radio transmissions, for example, wireless communications 26 (e.g., beamforming or beams). For example, transceiver 106 may transmit or receive a signal that includes one or more SS blocks. In some examples, the transceiver 106 may measure a received signal in order to determine signal quality and for providing feedback. For example, transceiver 106 may communicate with modem 108 to transmit messages generated by the synchronization signal management component 40 and to receive messages and forward them to the synchronization signal management component 40.

RF front end 104 may be connected to one or more antennas 102 and may include one or more low-noise amplifiers (LNAs) 141, one or more switches 142, 143, 146 one or more power amplifiers (PAs) 145, and one or more filters 144 for transmitting and receiving RF signals. In an aspect, components of RF front end 104 may connect with transceiver 106. Transceiver 106 may connect to one or more modems 108 and processor 103.

In an aspect, LNA 141 may amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the synchronization signal management component 40.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and specified gain value of the PA 145 based on a desired gain value for a particular application.

Also, for example, one or more filters 144 may be used by RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be connected to a specific LNA 141 and/or PA 145. In an aspect, RF front end 104 may use one or more switches 142, 143, 146 to select a transmit or receive path using a specified filter 144, LNA 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 12 and/or UE 14 may communicate with, for example, network entity 20. In an aspect, for example, modem 108 may configure transceiver 106 to operate at a specified frequency and power level based on the UE configuration of the UE 12 and/or UE 14 and communication protocol used by modem 108.

In an aspect, modem 108 may be a multiband-multimode modem, which can process digital data and communicate with transceiver 106 such that the digital data is sent and received using transceiver 106. In an aspect, modem 108 may be multiband and be configured to support multiple frequency bands for a specific communications protocol. In an aspect, modem 108 may be multimode and be configured to support multiple operating networks and communications protocols. In an aspect, modem 108 may control one or more components (e.g., RF front end 104, transceiver 106) of the network entity 20, the UE 12, and/or the UE 14 to enable transmission and/or reception of signals based on a specified modem configuration. In an aspect, the modem configuration may be based on the mode of the modem and the frequency band in use. In another aspect, the modem configuration may include SS block group information associated with UE 12, UE 14, and/or the network entity 20 during cell search, cell selection and/or cell reselection.

The UE 12 and/or the UE 14 may further include memory 130, such as for storing data used herein and/or local versions of applications or synchronization signal management component 40 and/or one or more of its subcomponents being executed by processor 103. Memory 130 may include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining synchronization signal management component 40 and/or one or more of the sub-components of synchronization signal management component 40, and/or data associated therewith, when the network entity 20 is operating processor 103 to execute synchronization signal management component 40 and/or one or more of its sub-components. In another aspect, for example, memory 130 may be a non-transitory computer-readable storage medium.

Figure 1B:
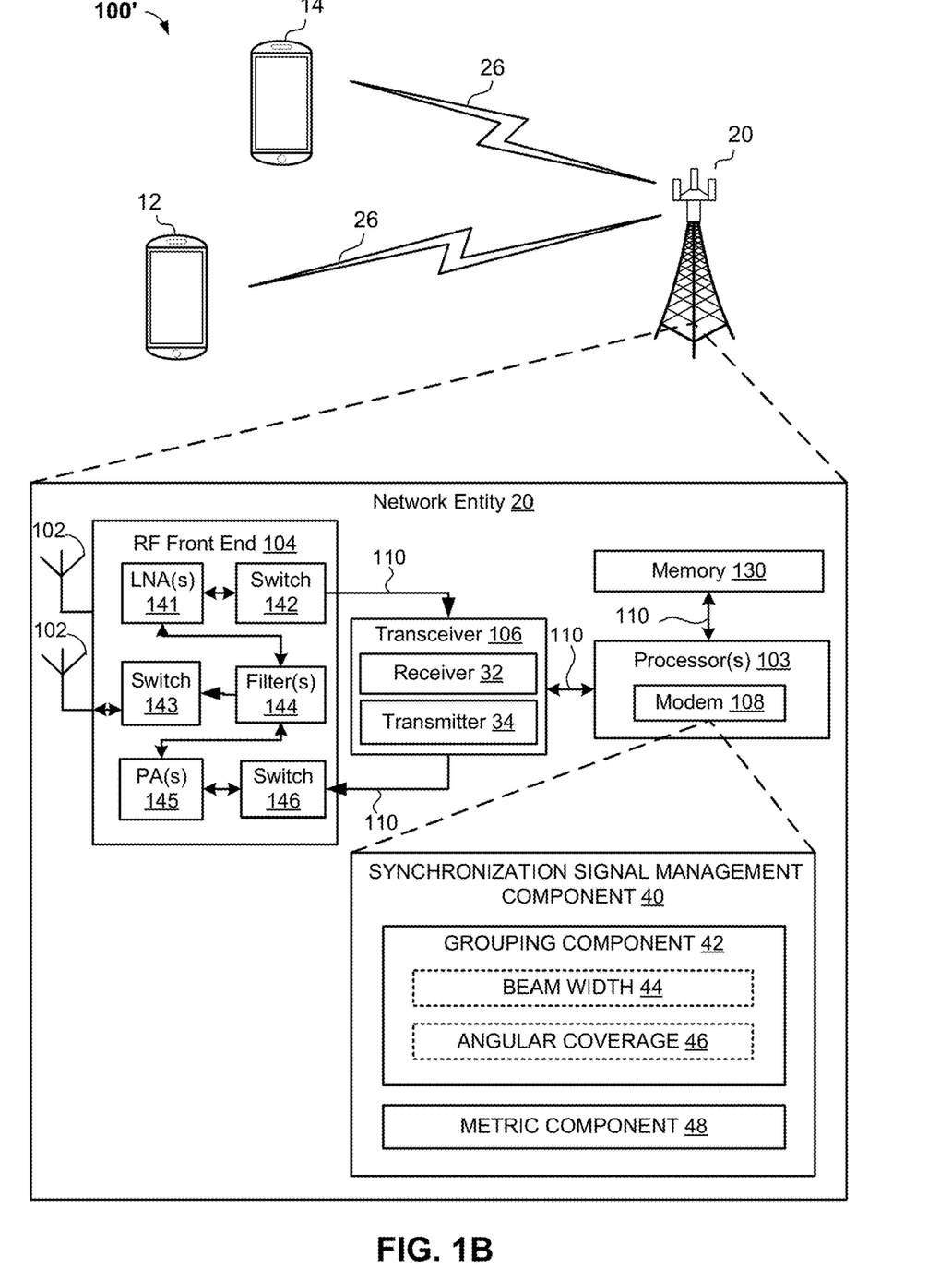
FIG. 1B is a diagram illustrating a second example of a wireless communications system (e.g., a 5G NR system) including a base station and one or more user equipments (UEs) for signaling synchronization block patterns, according to one or more of the presently described aspects.

Referring to FIG. 1B, in an aspect, similar to the wireless communication system 100 in FIG. 1A, a wireless communication system 100' (e.g., a 5G NR system) may include at least the UE 12 or the UE 14 in communication coverage of the at least one network entity 20 (e.g., a base station or a gNB, or a cell thereof, in a 5G NR network). The UE 12 and/or UE 14 may communicate with a network via the network entity 20.

According to the present aspects, the network entity 20 may include one or more processors 103 and a memory 130 that may operate in combination with a synchronization signal management component 40 to control a grouping component 42 (including parameter components, e.g., beam width 44, and/or angular coverage 46), and/or a metric component 48, for performing synchronization signal management, configuring/signaling synchronization block patterns, and/or related operations as described herein.

The synchronization signal management component 40, the grouping component 42, and/or the metric component 48, may include hardware, firmware, and/or software code executable by a processor for performing grouping, configuring, transmitting, and related SS block operations. For example, the hardware may include, for example, a hardware accelerator, or specialized processor.

Moreover, in an aspect, the network entity 20 may include RF front end 104 and transceiver 106 for receiving and transmitting radio transmissions, for example, wireless communications 26 (e.g., beamforming or beams). For example, transceiver 106 may transmit or receive a signal that includes one or more SS blocks. In some examples, the transceiver 106 may measure a received signal in order to determine signal quality and for providing feedback. For example, transceiver 106 may communicate with modem 108 to transmit messages generated by the synchronization signal management component 40 and to receive messages and forward them to the synchronization signal management component 40.

The network entity 20 may further include memory 130, such as for storing data used herein and/or local versions of applications or synchronization signal management component 40 and/or one or more of its subcomponents being executed by processor 103.

Figure 2:
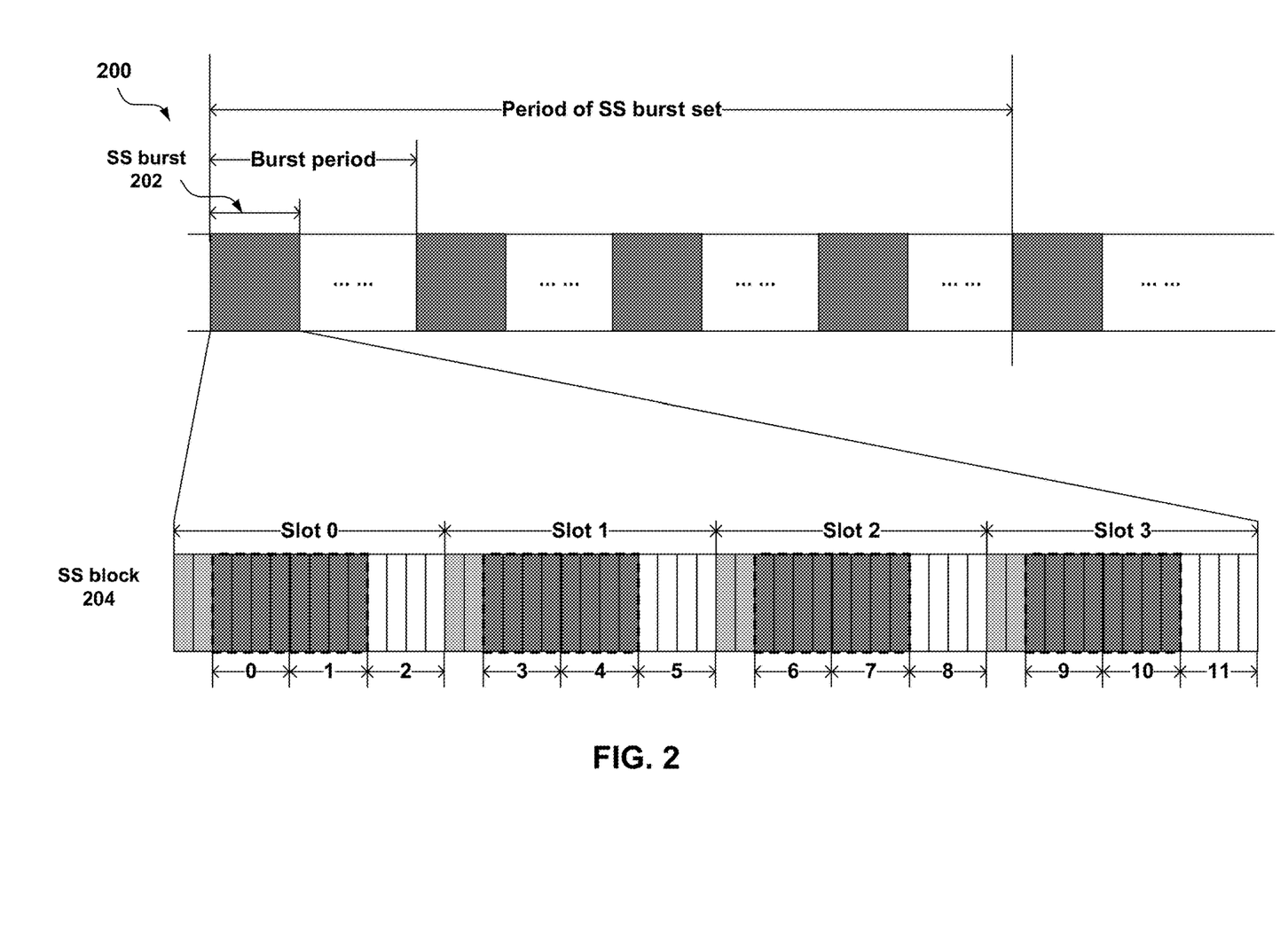
FIG. 2 illustrates an example of synchronization signal (SS) blocks and SS bursts in a wireless communications system (e.g., a 5G NR system), according to one or more of the presently described aspects.

Referring to FIG. 2, in some implementations, an SS block transmission scheme 200 may be used by a base station (e.g., the network entity 20 in FIG. 1) for transmitting one or more SS blocks (e.g., PSS, SSS, and/or PBCH) to a UE (e.g., the UE 12 or the UE 14 in FIG. 1). In an example, an SS burst set (e.g., 20 ms) may include one or more beams in a same beam direction or different beam directions. In an aspect, at least an SS burst 202 (e.g., with 0.5 ms, or 1 ms duration) may be transmitted in a burst period (e.g., 5 ms or 10 ms). In some examples, the SS burst 202 may include one or more slots (e.g., 4 slots as shown) in an SS block 204, and each slot may include 14 OFDM symbols. In an aspect, each slot in the SS block 204 may include downlink control information (e.g., in the first two OFDM symbols of each slot), and three SSs (e.g., a PSS, an SSS, and/or at least a PBCH) with 4 OFDM symbols in each SS.

Figure 3:
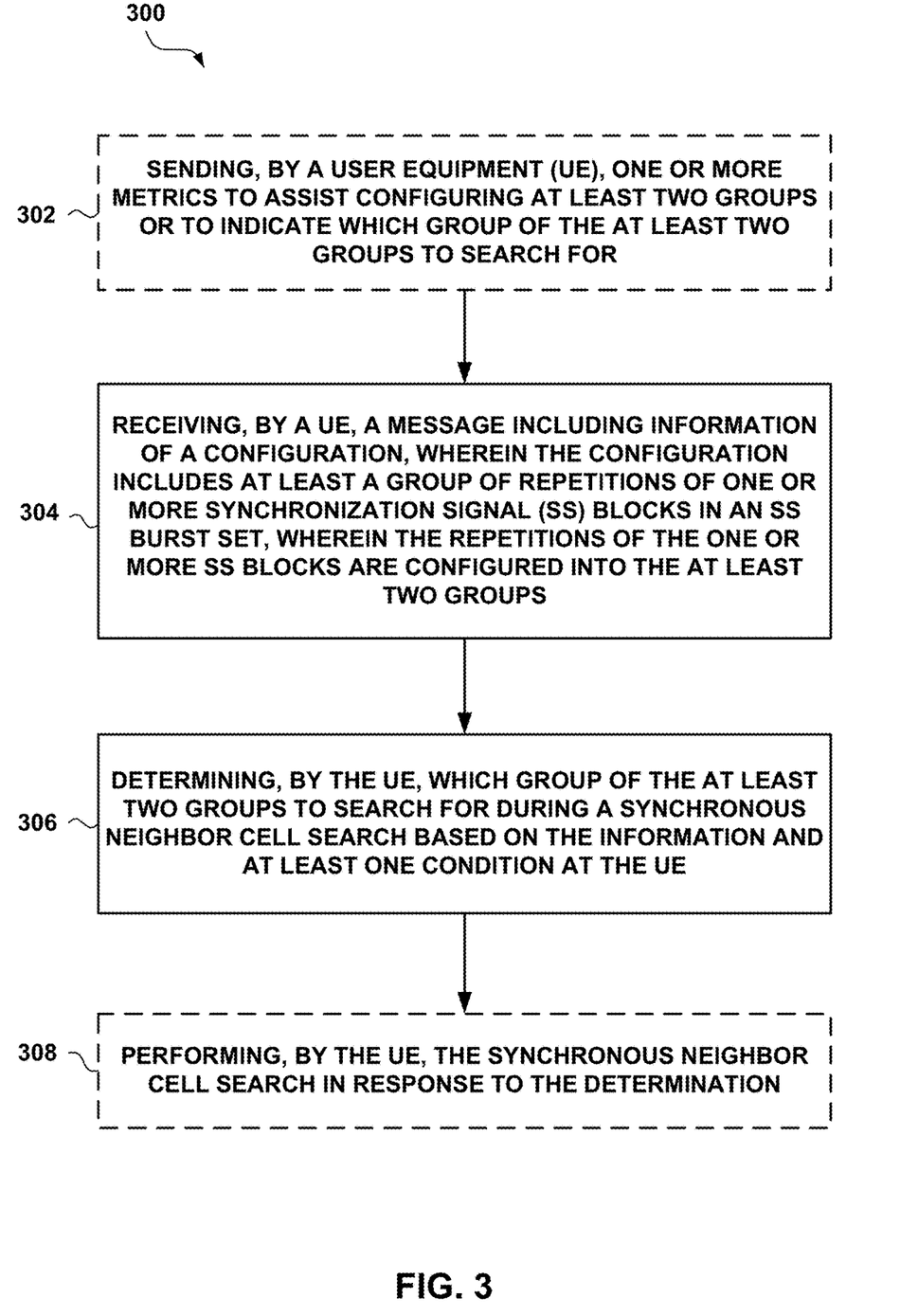
FIG. 3 is a flow chart of a first example method of signaling synchronization block patterns and configurations, according to one or more of the presently described aspects.

Referring to FIG. 3, in an operational aspect, the UE 12 or UE 14 (FIG. 1) may perform one or more aspects of a method 300 for signaling synchronization block patterns and configurations in a wireless communications system (e.g., a 5G NR system). For example, one or more of the processors 103, the memory 130, the modem 108, the transceiver 106, the synchronization signal management component 40, the grouping component 42, and/or the cell search component 50, may be configured to perform aspects of the method 300.

In an aspect, at block 302, the method 300 may optionally include sending, by a UE, one or more metrics to assist configuring at least two groups or to indicate which group of the at least two groups to search for. In an aspect, for example, the synchronization signal management component 40, the grouping component 42, the metric component 48, e.g., in conjunction with one or more of the processors 103, the memory 130, the modem 108, and/or the transceiver 106, may be configured to transmit one or more metrics to assist the network entity 20 to configure at least two groups of SS blocks for the UE 12 or 14, and/or to indicate which group of the at least two groups for the UE 12 or 14 to search for.

In an aspect, at block 304, the method 300 may include receiving, by the UE, a message including information of a configuration, wherein the configuration includes at least a group of repetitions of one or more SS blocks in an SS burst set, wherein the repetitions of the one or more SS blocks are configured into at least two groups. In an aspect, for example, the synchronization signal management component 40, e.g., in conjunction with one or more of the processors 103, the memory 130, the modem 108, and/or the transceiver 106, may configure to receive an indication, a configuration, or a message including information of a configuration. In an aspect, the configuration may include at least a group of repetitions of one or more SS blocks, and the repetitions of the one or more SS blocks are configured into at least two groups.

In an aspect, at block 306, the method 300 may include determining, by the UE, which group of the at least two groups to search for during a synchronous neighbor cell search based on the information and at least one condition at the UE. In an aspect, for example, the synchronization signal management component 40, the grouping component 42, and/or the cell search component 50, e.g., in conjunction with one or more of the processors 103, the memory 130, the modem 108, and/or the transceiver 106, may be configured to determine which group of the at least two groups to search for during a synchronous neighbor cell search.

In an aspect, at block 308, the method 300 may optionally include performing, by the UE, the synchronous neighbor cell search in response to the determination. In an aspect, for example, the synchronization signal management component 40, and/or the cell search component 50, e.g., in conjunction with one or more of the processors 103, the memory 130, the modem 108, and/or the transceiver 106, may be configured to perform the synchronous neighbor cell search in response to the determination at block 306.

Figure 4:
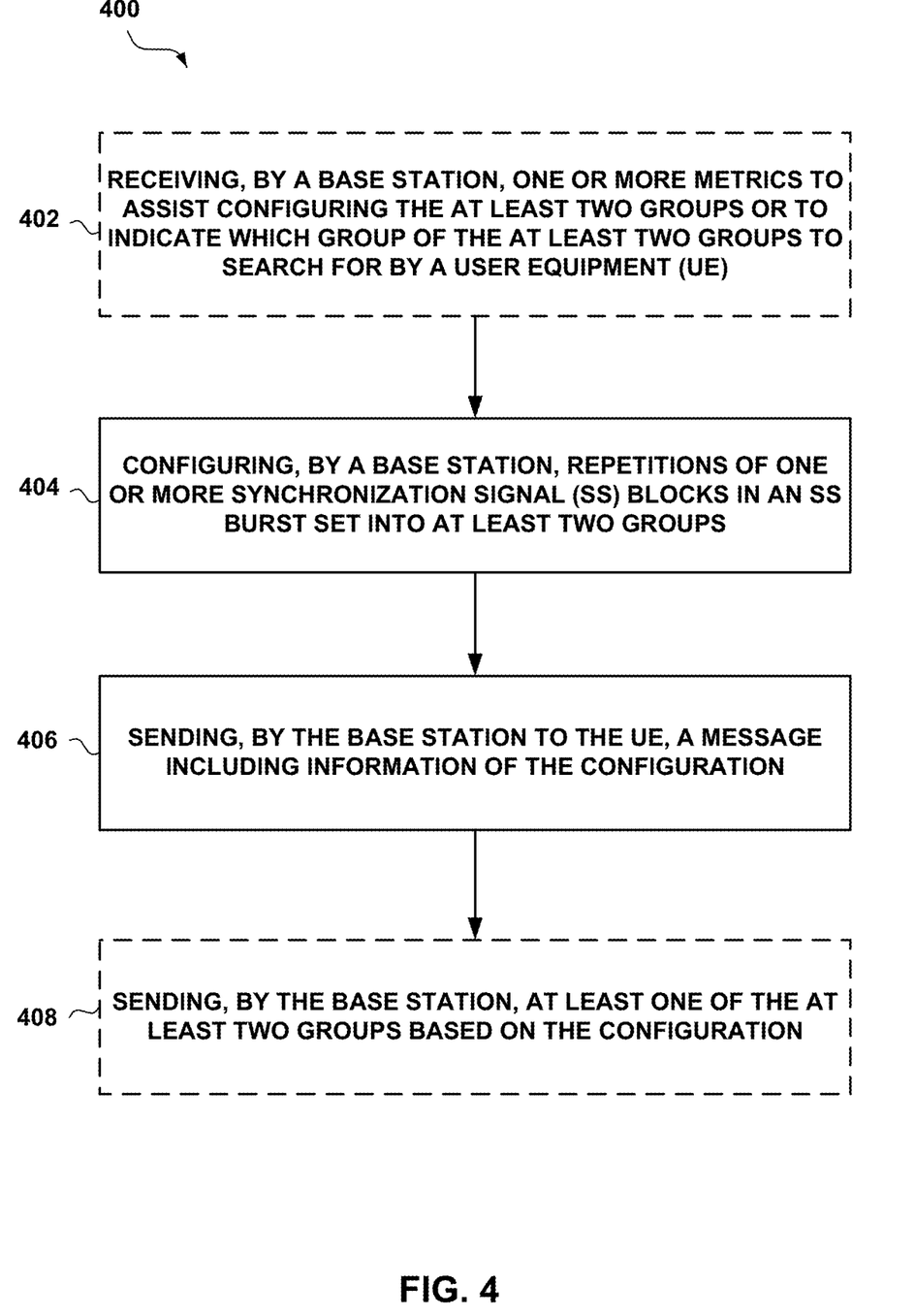
FIG. 4 is a flow chart of a second example method of example method of signaling synchronization block patterns and configurations, according to one or more of the presently described aspects.

Referring to FIG. 4, in an operational aspect, the network entity 20 (FIG. 1) may perform one or more aspects of a method 400 for signaling synchronization block patterns and configurations in a wireless communications system (e.g., a 5G NR system). For example, one or more of the processors 103, the memory 130, the modem 108, the transceiver 106, the synchronization signal management component 40, the grouping component 42, and/or the metric component 48, may be configured to perform aspects of the method 400.

In an aspect, at block 402, the method 400 may optionally include receiving, by the base station, one or more metrics to assist configuring the at least two groups or to indicate which group of the at least two groups to search for by a UE. In an aspect, for example, the synchronization signal management component 40, the grouping component 42, the metric component 48, e.g., in conjunction with one or more of the processors 103, the memory 130, the modem 108, and/or the transceiver 106, may be configured to receive one or more metrics to assist configuring the at least two groups, and/or to indicate which group of the at least two groups to search for by the UE 12 or 14.

In an aspect, at block 404, the method 400 may include configuring, by a base station, repetitions of one or more SS blocks in an SS burst set into at least two groups. In an aspect, for example, the synchronization signal management component 40, and/or the grouping component 42, e.g., in conjunction with one or more of the processors 103, the memory 130, the modem 108, and/or the transceiver 106, may configure or form the repetitions of one or more SS blocks in an SS burst set into two or more groups.

In an aspect, at block 406, the method 400 may include sending, by the base station to a UE, a message including information of the configuration. In an aspect, for example, the synchronization signal management component 40, e.g., in conjunction with one or more of the processors 103, the memory 130, the modem 108, and/or the transceiver 106, may be configured to transmit or send a message including information of the configuration at block 404.

In an aspect, at block 408, the method 400 may optionally include sending, by the base station, at least one of the at least two groups based on the configuration. In an aspect, for example, the synchronization signal management component 40, and/or the grouping component 42, e.g., in conjunction with one or more of the processors 103, the memory 130, the modem 108, and/or the transceiver 106, may be configured to send or transmit at least one group of SS blocks based on the configuration at block 404.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a telecommunications system have been presented with reference to an LTE/LTE-A or a 5G NR communications system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications, comprising:
   receiving, by a user equipment (UE), a message including information of a configuration, wherein the configuration includes at least a group of repetitions of one or more synchronization signal (SS) blocks in an SS burst set, wherein the repetitions of the one or more SS blocks are configured into at least two groups; and
   determining, by the UE, which group of the at least two groups to search for during a synchronous neighbor cell search based on the information and at least one condition at the UE,
   wherein the at least two groups are configured based on different beam widths.

2. The method of claim 1, further comprising:
   performing, by the UE, the synchronous neighbor cell search in response to the determination.

3. The method of claim 1, wherein the at least two groups include:
   a first group having one or more beams with broad beam width and low beamforming gain, and
   a second group having one or more beams with narrow beam width and high beamforming gain.

4. The method of claim 1, wherein the message is at least one of a master information block (MIB), a master system information block (mSIB), a system information block (SIB), a radio resource control (RRC) message, a medium access control (MAC) control element (CE), or a downlink control information (DCI) message.

5. The method of claim 1, further comprising:
sending, by the UE, one or more metrics to assist configuring the at least two groups or to indicate which group of the at least two groups to search for.

6. The method of claim 5, wherein the one or more metrics include at least one of a battery level of the UE, a function of search parameters, or an indication of preferred group, group size, or an SS block repetition pattern.

7. The method of claim 1, wherein each of the at least two groups is configured based on an angular coverage.

8. The method of claim 1, wherein each of the at least two groups is divided into multiple subgroups, wherein each subgroup covers a particular angular spread of a cell.

9. The method of claim 8, wherein the information includes a restriction to one of the multiple subgroups based on an estimation at a base station or the at least one condition at the UE.

10. The method of claim 9, wherein the estimation is based on one or more UE reports, and wherein the one or more UE reports include a UE positioning report, a UE orientation report, or a UE mobility report.

11. A user equipment (UE) for wireless communications, comprising:
a receiver;
a memory configured to store instructions; and
at least one processor communicatively coupled with the receiver and the memory, wherein the at least one processor is configured to execute the instructions to:
receive, via the receiver, a message including information of a configuration, wherein the configuration includes at least a group of repetitions of one or more synchronization signal (SS) blocks in an SS burst set, wherein the repetitions of SS blocks in the SS burst set are configured into at least two groups; and
determine which group of the at least two groups to search for during a synchronous neighbor cell search based on the configuration and at least one condition at the UE,
wherein the at least two groups are configured based on different beam widths.

12. The UE of claim 11, wherein the at least one processor is further configured to perform the synchronous neighbor cell search in response to the determination.

13. The UE of claim 11, wherein the at least two groups include:
a first group having one or more beams with broad beam width and low beamforming gain; and
a second group having one or more beams with narrow beam width and high beamforming gain.

14. The UE of claim 11, wherein each of the at least two groups is configured based on an angular coverage.

15. The UE of claim 11, wherein each of the at least two groups is divided into multiple subgroups, wherein each subgroup covers a particular angular spread of a cell.

16. The UE of claim 15, wherein the information includes a restriction to one of the multiple subgroups based on an estimation at a base station or the at least one condition at the UE.

17. A method of wireless communications, comprising:
configuring, by a base station, repetitions of one or more synchronization signal (SS) blocks in an SS burst set into at least two groups; and
sending, by the base station to a user equipment (UE), a message including information of the configuration, wherein the at least two groups are configured based on different beam widths.

18. The method of claim 17, further comprising:
receiving, by the base station, one or more metrics to assist configuring the at least two groups or to indicate which group of the at least two groups to search for by the UE.

19. The method of claim 18, wherein the one or more metrics include at least one of a battery level of the UE, a function of search parameters, or an indication of preferred group, group size, or an SS block repetition pattern.

20. The method of claim 17, wherein each of the at least two groups is configured based on an angular coverage and is divided into multiple subgroups, wherein each subgroup covers a particular angular spread of a cell, and wherein the information includes a restriction to one of the multiple subgroups based on an estimation at the base station or a battery level at the UE.

21. The method of claim 17, wherein the at least two groups include:
a first group having one or more beams with broad beam width and low beamforming gain; and
a second group having one or more beams with narrow beam width and high beamforming gain.

22. The method of claim 17, wherein each of the at least two groups is configured based on an angular coverage.

23. The method of claim 17, wherein each of the at least two groups is divided into multiple subgroups, wherein each subgroup covers a particular angular spread of a cell.

24. A base station for wireless communications, comprising:
a transceiver;
a memory configured to store instructions; and
at least one processor communicatively coupled with the transceiver and the memory, wherein the at least one processor is configured to execute the instructions to:
configure repetitions of one or more synchronization signal (SS) blocks in an SS burst set into at least two groups; and
send, to a user equipment (UE), a message including information of the configuration,
wherein the at least two groups are configured based on different beam widths.

25. The base station of claim 24, wherein the at least one processor is further configured to:
receive one or more metrics to assist configuring the at least two groups or to indicate which group of the at least two groups to search for by the UE.

26. The base station of claim 25, wherein the one or more metrics include at least one of a battery level of the UE, a function of search parameters, or an indication of preferred group, group size, or an SS block repetition pattern.

27. The base station of claim 24, wherein each of the at least two groups is configured based on an angular coverage and is divided into multiple subgroups, wherein each subgroup covers a particular angular spread of a cell, and wherein the information includes a restriction to one of the multiple subgroups based on an estimation at the base station or a battery level at the UE.

28. The base station of claim 24, wherein the at least two groups include:
a first group having one or more beams with broad beam width and low beamforming gain; and
a second group having one or more beams with narrow beam width and high beamforming gain.

29. The base station of claim 24, wherein each of the at least two groups is configured based on an angular coverage.

30. The base station of claim 24, wherein each of the at least two groups is divided into multiple subgroups, wherein each subgroup covers a particular angular spread of a cell.

* * * * *